United States Patent [19]

Tanigaki et al.

[11] Patent Number: 5,032,842
[45] Date of Patent: Jul. 16, 1991

[54] DETECTION SYSTEM WITH ADJUSTABLE TARGET AREA

[75] Inventors: Hidetoshi Tanigaki; Yoshiyuki Kiya, both of Nishinomiya, Japan

[73] Assignee: Furuno Electric Co., Ltd., Hyogo, Japan

[21] Appl. No.: 475,380

[22] Filed: Feb. 5, 1990

[30] Foreign Application Priority Data

Feb. 7, 1989 [JP] Japan ................................. 1-13235[U]

[51] Int. Cl.⁵ ................................................ G01S 7/22
[52] U.S. Cl. .................................................. 342/182
[58] Field of Search ......................... 342/176, 182, 183

[56] References Cited

U.S. PATENT DOCUMENTS 4,224,619 9/1980 Bean et al. .
4,281,326 7/1981 Anderson .

Primary Examiner—Mark Hellner

[57] ABSTRACT

A detection system uses a radar apparatus for displaying conditions of the surrounding geographical and an area marker defining a selected geographical area. The area marker and conditions are displayed on an indicator. If a target is determined to be in the area marker, an alarm is activated. The area marker is indicated by specifying only two points on the screen of the indicator.

17 Claims, 6 Drawing Sheets

DETECTION SYSTEM WITH ADJUSTABLE TARGET AREA

BACKGROUND OF THE INVENTION

The present invention relates to a detection system for displaying searched surrounding conditions and an area marker defining a selected geographical area on the display face of an indicator.

The present invention can be embodied in a radar apparatus or in a sonar apparatus.

Hereinafter, the present invention will be explained as embodied in a radar apparatus.

A prior art radar apparatus displays an area marker defining a selected geographical area of constant angular width and constant range depth on the screen of an indicator and activates a warning alarm when a target enters the area, as described in an unexamined Japanese patent publication No. 61-209380. With the prior art radar apparatus, a distance marker and a bearing marker are used to draw two arcs and two straight lines each connecting ends of the two arcs to form and indicate an area marker. First, the distance marker specifies a first range from the radar antenna, and the bearing marker specifies a first bearing. Then, the distance marker and bearing marker are moved on the display face of an indicator to specify a second range and a second bearing respectively to obtain an area marker formed with two arcs and two straight lines for defining a geographical area. Thus, bothersome operation is required to display an area marker on the display face of an indicator of the prior art radar apparatus.

SUMMARY OF THE INVENTION

Accordingly, an object of the present invention is to provide a detection system for displaying searched surrounding conditions, which requires simple operation to display an area marker defining a selected geographical area on the screen of an indicator.

Another object of the invention is to provide a detection system which is capable of displaying an area marker defining a selected geographical area by specifying two points on the display face of the indicator.

Another object of the invention is to provide a detection system which identifies with a movable marker two points on the face of the indicator for presenting an area marker defining a selected geographical area.

Another object of the invention is to provide a detection system which identifies two points on the display face of the indicator for presenting an area marker defining a selected geographical area by using a displayed marker controlled to be moved by a track ball.

Another object of the invention is to provide a radar apparatus which is capable of displaying an area marker defining a selected geographical area by specifying two points on the display face of the indicator.

Another object of the invention is to provide a radar apparatus which is capable of displaying an area marker defining a selected geographical area of constant angular width and constant range depth by specifying two points on the face of the indicator with a displayed movable marker controlled by a track ball.

A further object of the invention is to provide a detection system which is capable of displaying an area marker successively expanded or shrinked when a track ball is turned.

According to one aspect of the present invention, there is provided a detection system for receiving incoming signals and displaying the signals on the screen of an indicator, which comprises (i) means for specifying a first point and a second point on the screen of the indicator, (ii) means for producing first position data of the first point and second position data of the second point, (iii) means for producing signals representative of an area marker defining a geographical area on the screen of the indicator based on the first and the second position data, and (iv) means for displaying the resultant signals to indicate the area marker on the screen of the indicator.

According to another aspect of the present invention, there is provided a detection system for displaying searched surrounding conditions and an area marker defining a geographical area on the screen of an indicator and producing a signal when a target is in the area, which comprises (i) means for specifying a first point and a second point on the screen of the indicator, (ii) means for producing first position data of the first point and second position data of the second point, (iii) means for producing signals representative of an area marker based on the first and the second position data, and (iv) means for displaying the resultant signals to indicate the area marker on the screen of the indicator.

BRIEF DESCRIPTION OF THE DRAWINGS

In the drawings.

Throughout the drawings, the same reference numeral are given to like components.

DESCRIPTION OF THE PREFERRED EMBODIMENTS

Figure 1:
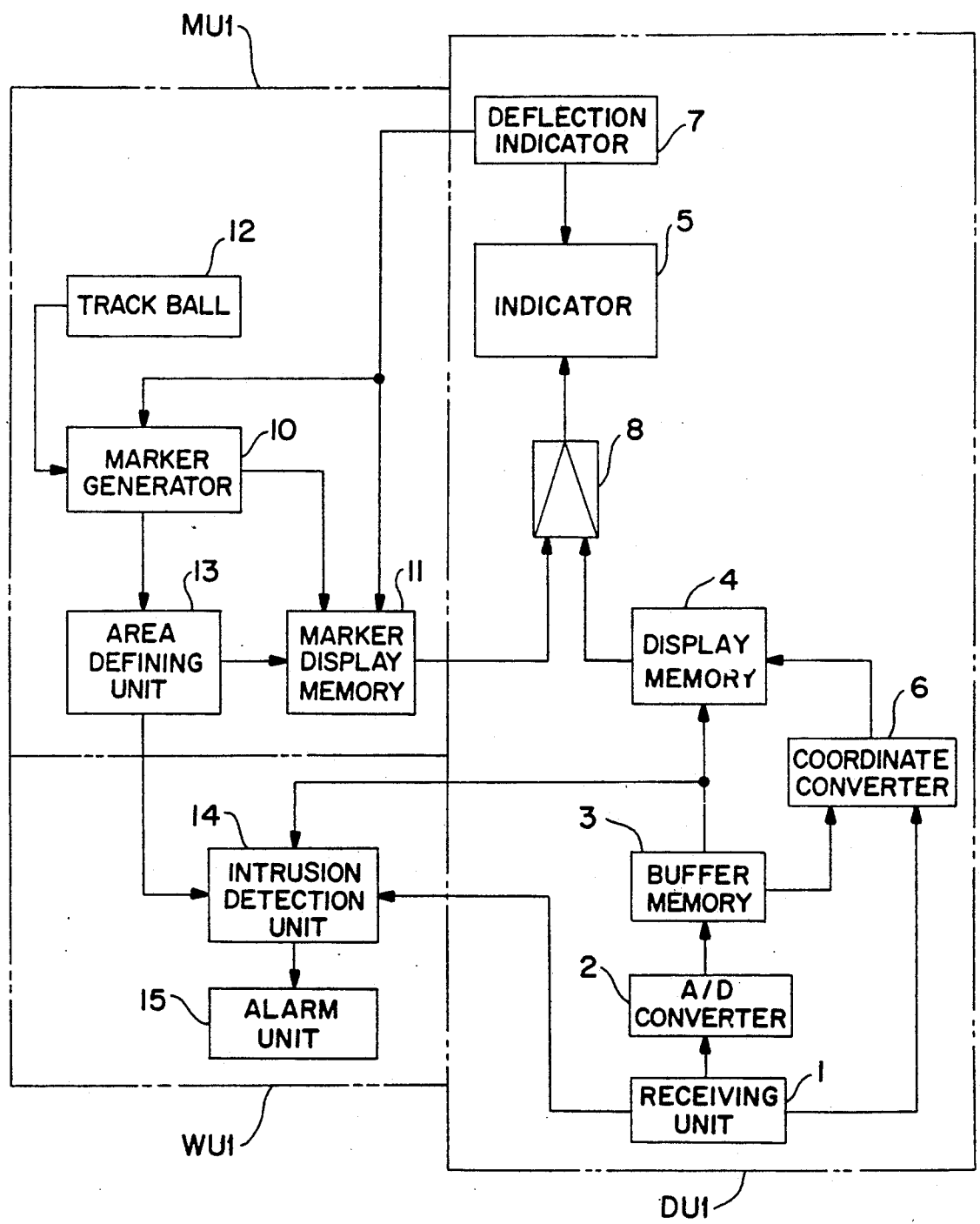
FIG. 1 shows a block diagram of a embodiment according to the present invention.

Referring to FIG. 1, there are shown a detecting laying unit DU1, a marker signal generating unit MU1 and a warning unit WU1. A radar transmitting and receiving unit 1 which is constructed in a known manner successively radiates search pulse signals in different directions from a rotating antenna and receives echo signals reflected by targets. An analog-to-digital converter (hereinafter referred to as "A/D converter") 2 converts target return signals produced by the radar transmitting and receiving unit 1 into digital signals and supplies a buffer memory 3 with the resultant signals. The buffer memory 3 is comprised of a high-speed static random access memory having sufficient memory elements for storing all the echo signals produced during one radar sweep and coming from a range being searched. The target return signals stored in the buffer memory 3 are transmitted to a display memory 4 to be stored therein. The display memory 4 is comprised of a dynamic random access memory having memory elements which are defined in a Cartesian coordinates reference system and correspond geographically to the picture elements of an indicator 5. Each target location is represented by polar coordinates (R, θ), and thus, each of target return signals stored in the buffer memory 3 has distance and bearing information, since the radar transmitting and receiving unit 1 successively radiates in different directions search pulse signals from and receives resultant echo signals by a rotating radar antenna, as in a well known manner. Signals stored in the memory elements of the buffer memory 3 are read out therefrom, transmitted to the display memory 4 and written into corresponding memory elements thereof, each memory element of the display memory 4 being represented by Cartesian coordinates (X,Y). Thus, coordinate conversion is made from polar coordinates to Cartesian coordinates. The distance "R" between the radar antenna and a target corresponds to an address of a memory element in the buffer memory 3, and the bearing of the target "θ" corresponds to a pointing direction of the radar antenna. A coordinate converter 6 is constructed in a known manner and performs coordinate conversion from polar coordinates to Cartesian coordinates based on signals representative of the polar coordinates of a target location supplied from the buffer memory 3 and a signal representative of a reference bearing supplied from the radar transmitting and receiving unit 1, and thus, produces signals representative of an address of a memory element in the display memory 4 corresponding to a memory element in the buffer memory 3 from which a target return signal is read out. Signals stored in the buffer memory 3 are transmitted in a known manner to the display memory 4 during the period from a time instant when reception operation for receiving target return signals is completed to a time instant when another search pulse is radiated. An indicator 5 is comprised of, for example, a cathode-ray tube having the same number of picture elements as the number of the memory elements of the display memory 4. A deflection circuit 7 deflects electron beams of the cathode-ray tube and causes them to sweep picture elements of the indicator 5 horizontally and vertically. In synchronism with the electron beam scanning operation, signals are read out from corresponding memory elements of the display memory 4 and are coupled to the indicator 5 through video amplifier 8.

Figure 2:
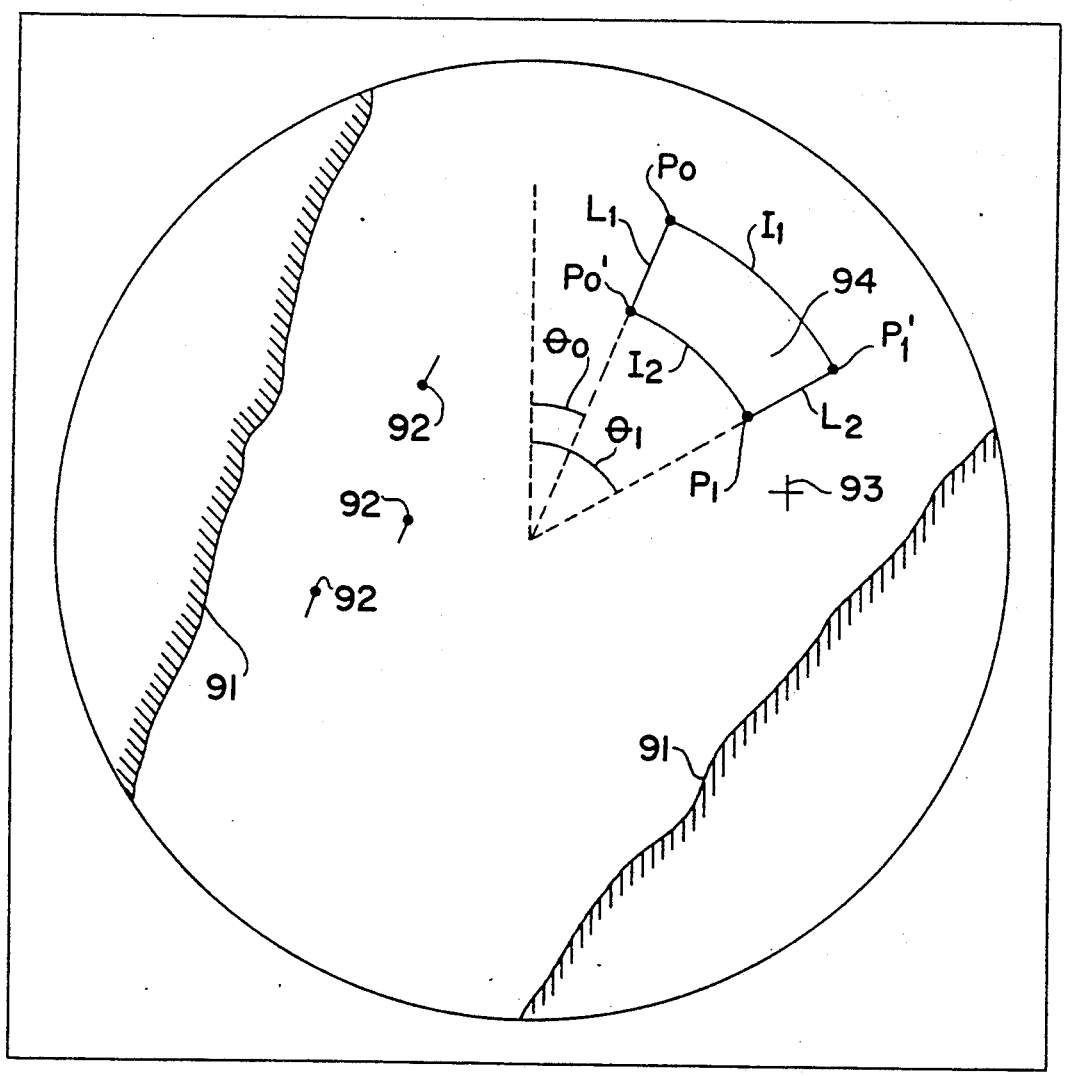
FIG. 2 shows an example of an image displayed on the screen of the indicator shown in FIG. 1.
Figure 4:
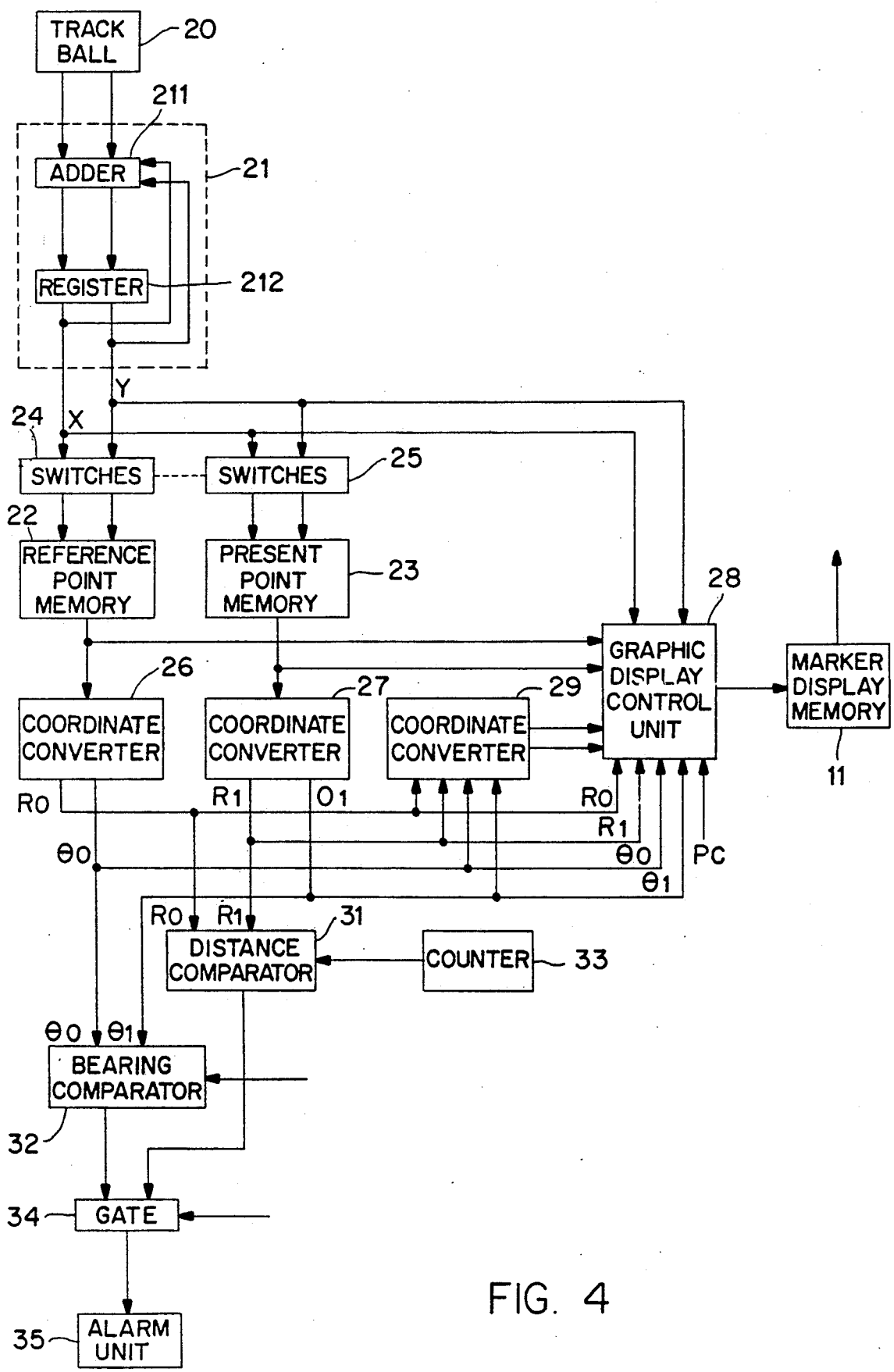
FIG. 4 shows a block diagram of another embodiment according to the present invention.

As a result, surrounding conditions around the ship are displayed on the screen of the indicator 5, as shown in FIG. 2. "91" represents shorelines, and "92", "92" and "92" represent other ships. The indicator 5 displays radar target return signals supplied from the video amplifier 8 and also indicates on the screen thereof marker signals produced by a marker generator 10 and once stored in a marker display memory 11 to present a marker 93 and signals produced by an area defining unit 13 and stored in the marker display memory 11 and supplied therefrom to present an area marker 94. It is to be noted that signals produced by the marker generator 10 can be supplied to the input of the video amplifier 8 instead of being supplied to the marker display memory 11. The marker generator 10 produces character data signals representative of the marker 93 indicated on the screen of the indicator 5, as shown in FIG. 2. The marker 93 is moved to a desired point on the screen of the indicator 5 by means of a track ball 12. The track ball 12 comprises a freely-rotatable ball and produces signals representative of X-axis rotational angle, Y-axis rotational angle and rotational directions. The marker display memory 11 is comprised of memory elements geographically corresponding to the picture elements of the indicator 5 and stores an area marker 94 formed by two arcs and two straight lines which will be displayed on the indicator 5. Signals stored in respective memory elements of the marker display memory 11 are successively read out in synchronism with the deflection of the electron beams of the indicator 5 by the deflection circuit 7 so that the signals are indicated at corresponding picture elements of the indicator 5 to present the area marker 94. The marker generator 10 controls the area defining unit 13 to produce signals representative of the area marker 94. The area defining unit 13 writes the area marker signals into the marker display memory 11. An intrusion detecting unit 14 passes target return signals reflected by targets within an area represented with the area marker 94 to an alarm unit 15. The intrusion detecting unit 14 may be comprised of a distance comparator 31, a bearing comparator 32, a counter 33 connected to the distance comparator 31 and 1 gate 34 as shown in FIG. 4. Input terminals of the distance comparator 31 and bearing comparator 32 are connected to corresponding output terminals of coordinates converters 136 and 137 of the area defining unit 13. The bearing comparator 32 is supplied with bearing signals from the radar transmitting and receiving unit 1. The gate 34 is supplied with echo signals from the buffer memory.

Figure 3:
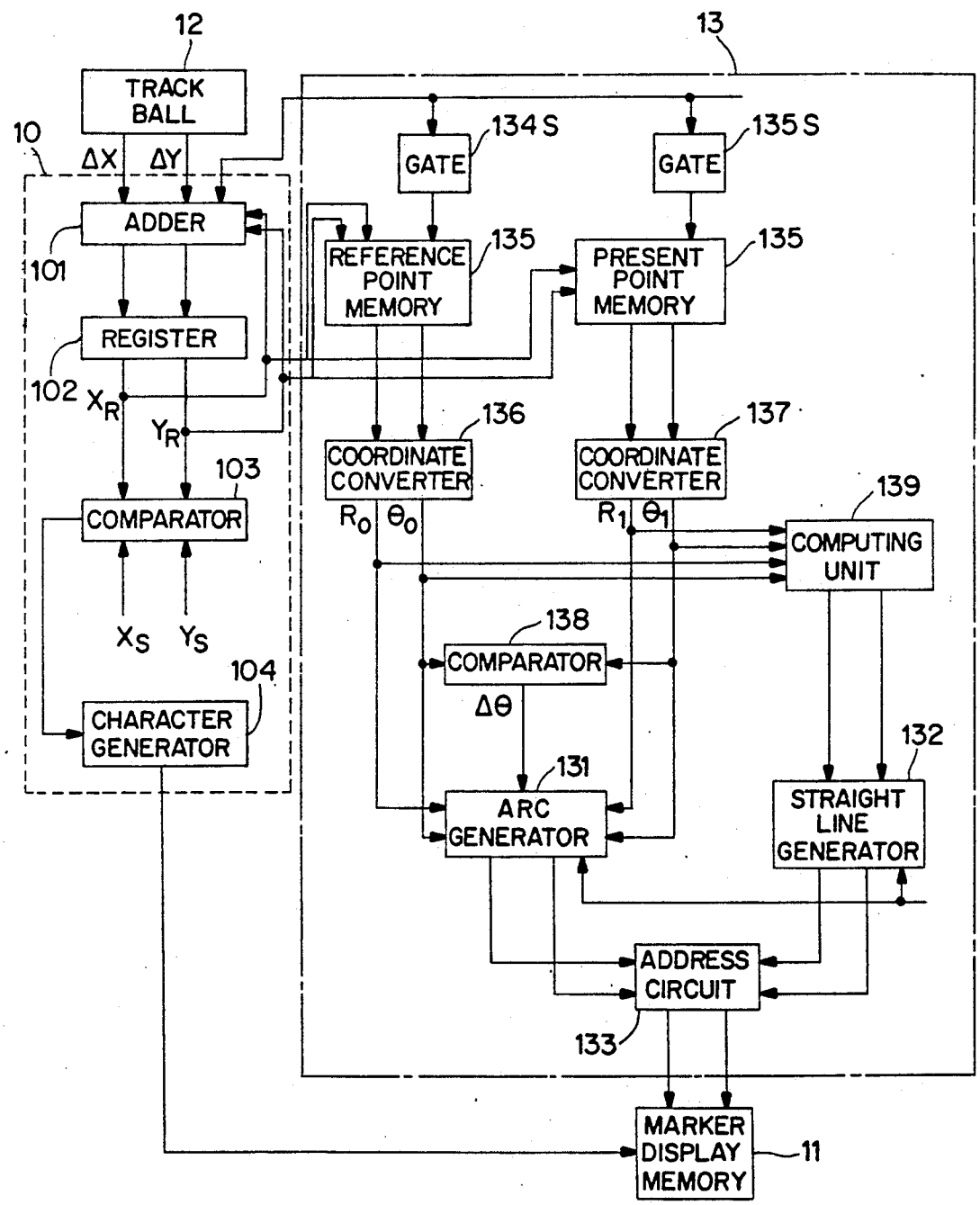
FIG. 3 shows a detailed block diagram of a portion of the embodiment shown in FIG. 1.

Referring to FIG. 3, data representative of rotation angles (ΔX, ΔY) produced by the track ball 12 are transmitted to an adder 101 of the marker generator 10. The adder 101 adds the rotation angle data supplied from the track ball 12 to the data having been stored in a register 102 and supplies the resultant added value to the inputs of the register 102 to be stored therein. Adding operations by the adder 101 are performed in response to timing clock pulse trains of a sufficiently-high frequency. The register 102 stores signals representative of a point at which the marker 93 is positioned. When the data stored in the register 102 are changed as the track ball is turned, the marker 93 is moved accordingly. A comparator 103 compares marker position data ($X_R$, $Y_R$) supplied from the register 102 with electron beams position data ($X_S$, $Y_S$) supplied from the deflection circuit 7 and produces a coincidence signal when a coincidence occurs therebetween to a character generator 104. The character generator 104 produces character signals representative of the marker 93 for the indicator 5 through the video amplifier 8 in response to the coincidence signal supplied from the comparator 103, thereby displaying the marker 93 on the screen.

Signals representative of the present position ($X_R$, $Y_R$) of the marker 93 determined by the track ball 12 are stored in the register 102. The output signals from the register 102 are supplied to a reference point memory 134 and a present point memory 135. The reference point memory 134 and the present point memory 135 are comprised of dynamic random access memory. To the clock input terminals of the reference point memory 134 and present point memory 135, there are supplied timing clock pulses of a sufficiently high frequency through switches 134S and 135S. The switches 134S and 135S are normally in a conduction state. The reference point memory 134 and present point memory 135 update data stored therein each time a timing clock pulse is applied to the input terminal thereof. The reference point memory 134 stores signals representative of a reference point for displaying the area marker 94. For example, when the marker 93 is positioned at a point designated as "PO" on the screen of the indicator 5 and the switch 134S is opened, position data representative of the point "PO" is written into and stored in the reference point memory 134 to be fixed therein. The signals representative of the reference point "PO" stored in the reference point memory 134 are supplied to a coordinates converter 136 as a reference point for drawing an outer arc 1. The coordinates converter 136 converts the reference point data ($X_O$, $Y_O$) expressed in Cartesian coordinates into corresponding reference point data ($R_O$, $\theta_O$) expressed in polar coordinates and supplies the resultant data to the arc generator 131. Since the switch 135S is being kept turned on, signals representative of the present position of the marker 93 are written into and stored in the present point memory 135 and are supplied to another coordinates converter 137. The coordinates converter 137 converts the present position data of the marker 93 expressed in Cartesian coordinates into a corresponding present position data ($R_1$, $\theta_1$) of the marker 93 expressed in polar coordinates. The angle data "$\theta_1$" produced by the coordinates converter 137 in relation to the present position of the marker 93 are supplied to one input terminal of a comparator 138. The angle data "$\theta_O$" produced by the coordinates converter 136 in relation to the reference point are also supplied to the other input terminal of the comparator 138. The comparator 138 compares the angle data "$\theta_1$" with the other angle data "$\theta_O$" and produces a difference signal "$\Delta\theta$" and supplies the resultant difference angle data to the arc generator 131. The arc generator 131 produces signals expressed in Cartesian coordinates for drawing the two arcs based on $R_O$, $\theta_O$, $R_1$, $\theta_1$ and $\Delta\theta$. The arc generator 131 successively increases the angle with respect to the angle "$\theta_O$" by an increment to obtain an angle value each time a pulse is supplied from the deflection circuit 7 to one input terminal until the amount of the angle variation reaches the angle difference $\Delta\theta$. The arc generator 131 produces signals corresponding to successive display points defined in Cartesian coordinates to form the outer arc on the screen of the indicator 5 based on the data "$R_O$", "$\theta_O$" and a varying angle data within the angle difference "$\Delta\theta$" each time a pulse is supplied thereto from the deflection circuit 7. An address circuit 133 identifies memory elements in the marker display memory 11 based on the signals supplied from the arc generator 131 so that signals for displaying the upper arc I1 are stored in the memory elements identified. The arc generator 131 also produces signals corresponding to successive display points defined in Cartesian coordinates to form the inner arc I2 on the screen. The arc generator 131 successively decreases the angle with respect to the angle "$\theta_1$" by a decrement to obtain an angle value each time a pulse is supplied from the deflection circuit 7 to one input terminal thereof until the amount of the angle variation reaches the angle difference "$\Delta\theta$". The arc generator 131 produces signals corresponding to successive display points defined in Cartesian coordinates to form the inner arc on the screen of the indicator 5 based on the data "$R_1$", "$\theta_1$" and a varying angle data within the angle difference "$\Delta\theta$" each time a pulse is supplied thereto from the deflection circuit 7. The address circuit 133 identifies memory elements in the marker display memory 131 so that signals for displaying the inner arc I2 are stored in the memory elements identified. Thus, the arc generator 131 produces signals for displaying the outer arc I1 based on the reference position data ($R_O$, $\theta_O$) supplied from the coordinates converter 136 and also produces signals for displaying the inner arc I2 based on the present position data ($R_1$, $\theta_1$). The signals representative of the arc I1 are produced in a clockwise direction starting at the point "PO", and signals representative of the inner arc I2 are produced in an anticlockwise direction starting at the point "P1". A straight line generator 132 produces signals representative of straight lines L1 and L2 respectively connecting the ends of the outer and inner arcs I1 and I2. The output signals ($R_O$, $\theta_O$) from the coordinates converter 136 and the output signals ($R_1$, $\theta_1$) from the coordinates converter 137 are supplied to input terminals of a computing unit 139 respectively. The computing unit 139 determines a point "PO'" based on the data "$R_O$", "$\theta_O$" and "$R_1$" and another point "P1'" based on the data "$R_1$", "$\theta_1$"and "$R_o$" and produces signals representative of these points "PO'" and "P1'" to the straight line generator 132. The straight line generator 132 produces signals corresponding to two straight lines respectively connecting the points "PC" and "PO'", and "P1" and "P1'". The address circuit 133 identifies memory elements in the marker display memory 11 based on the signals supplied from the straight line generator 132 so that signals for displaying the two straight lines are stored in the memory eements identified. It is to be noted that the signals representative of the two arcs and two straight lines to form the area marker 94 are written into the marker display memory 11 during flyback time of the indicator 5, controlled by the arc generator 131 and straight line generator 132. Then, the switch 135S is opened to fix the present position of the marker 93 ($R_1$, $\theta_1$) in the present point memory cf. As a result, signals representative of the area marker 94 formed with the two arcs and two straight lines are stored in the display memory 11. The signals taken out of the marker display memory 11 are supplied through the video amplifier 8 to the indicator 5 so that the area marker 94 is displayed together with received echoes on the screen of the indicator.

Referring to FIG. 4, a track ball 20 comprising a freely-rotatable ball produces signals representative of a rotation angle thereof turned in the X-axis direction and a X-axis rotational direction thereof and signals representative of a rotation angle thereof turned in the Y-axis direction and a Y-axis rotational direction thereof. The output signals from the track ball 20 are applied at the input terminals of a marker position signal generator 21. The signal generator 21 is comprised of an adder 211 and a register 212. The adder 211 adds the track ball rotation angle data supplied from the track ball 20 to the data having been stored in the register 212 and supplies the resultant added value to the inputs of the register 212. The register 212 stores and supplies signals representative of the position of the marker 93 on the display face of the indicator 5 to a reference point memory 22 and a present point memory 23 through key switches 24 and 25 respectively and also to input terminals of a graphic display control unit 28. The key switch 24 passes the output signals from the marker position signal generator 21 to the reference point memory 22 so that signals representative of a first position of the marker 93 are memorized in the memory 22 when the key switch 24 is depressed for a predetermined time period. Thus, a first position of the marker 93 is fixed. The key switch 25 associated with the switch 24 starts to pass the output signals from the signal generator 21 to the present point memory 23 when the key switch 24 is depressed for a predetermined time period and stops to pass the output signals therefrom to the memory 23 when the key switch 25 is depressed for a predetermined time period. Thus, the output signals from the marker position signal generator 21 are continuously supplied to the input terminals of the present point memory from a time instant when the key switch is depressed to another time instant when the switch 25 is operated. The reference point memory 22 stores signals representative of a reference point "PO" of the marker 93 and supplies the signals to the input terminals of a coordinates converter 26 and also to the input terminals of the graphic display control unit 28. The coordinate converter 26 converts the Cartesian coordinates ($X_O$, $Y_O$) of the reference point "PO" to corresponding coordinates ($R_o$, $\theta_o$) in polar coordinates system. The present point memory 23 stores signals representative of a present point "P1" of the marker 93 and supplies the signals to the input terminals of a coordinate converter 27 and also to the input terminals of the graphic display control unit 28. The coordinate converter 27 converts the Cartesian coordinates ($X_1$, $Y_1$) of the present position of the marker 93 to corresponding coordinates ($R_1$, $\theta_1$) in polar coodinates reference system. The output signals $R_o$, $\theta_o$) of the coordinates converter 26 are supplied to input terminals of a coordinates converter 29 and also to input terminals of the graphic display control unit 28. The output signals ($R_1$, $\theta_1$) of the coordinates converter 27 are also supplied to the input terminals of the coordinates converter 29 and to input terminals of the graphic display control unit 28. The coordinates converter 29 produces signals representative of Cartesian coordinates ($X_2$, $Y_2$) of a point "PO'" based on the input signals "$\theta_o$" and "$R_1$" and also produces signals representative of Cartesian coordinates ($X_3$, $Y_3$) of a point "P1'" based on the input signals "$\theta$" and "Ro". The output signals ($X_2$, $Y_2$) and ($X_3$, $Y_3$) are supplied to input terminals of the graphic display control 28. The graphic display control unit 28 is also provided with signals representative of the center of the face of the indicator. The graphic display control unit 28 is comprised of, for example, an integrated circuit Model "$\mu$PD72020" manufactured by NEC Corporation. The graphic display control unit 28 produces signals representative of the marker 93 at a point on the screen of the indicator 5, with the point determined by the track ball 20, based on the output signals (X, Y) from the signal generator 21. The signals representative of the marker 93 are written into and stored in the marker display memory 11 and then supplied to the indicator 5 through the video amplifier 8 so that the marker 93 is indicated at a point on the screen. Thus, when the track ball 20 is appropriately turned, the marker 93 is moved to a desired point on the display face of the indicator. The graphic display control unit 28 produces signals representative of the outer arc "I1" based on the origin data "$P_c$", the distance data "Ro" and the angle data "$\theta_o$" and "$\theta_1$" and also signals representative of the inner arc "I2" based on the the origin data "$P_c$", the distance data "$R_1$" and the angle data "$\theta_1$" and "$\theta_o$". The unit 28 also produces signals representative of a left straight line "L1" based on a pair of the Cartesian coordinates (Xo, Yo) and ($X_2$, $Y_2$) and signals representative of a right straight line "L2" based on a pair of the Cartesian coordinates ($X_1$, $Y_1$) and ($X_3$, $Y_3$). To the marker display memory 11, there are supplied from the unit 28 and stored therein the signals representative of the outer arc "I1", the inner arc "I2", the left straight line "L1" and the right straight line "L2" which are produced by the graphic display control unit 28. The signals stored in the display memory 4 are taken out and supplied to the indicator 5 so that the area marker 94 is displayed on the screen of the indicator 5.

The coordinates converter 26 supplies the distance data "Ro" representative of the distance between the origin "Pc" and the reference point "Po" to one input terminal of a distance comparator 31 and the angle data "$\theta_o$" to one input terminal of a bearing comparator 32. The coordinates converter 27 supplies the distance data "$_1$" representative of the distance between the origin "Pc" and the present position of the marker 93 to another input terminal of the distance comparator 31 and the angle data "$\theta_1$" to another input terminal of the bearing comparator 32. A counter 33 successively produces count values in proportion to the distance a radiated radar search pulse signal travels and supplies the resultant count values to another input terminal of the distance comparator 31. The distance comparator 31 compares the distance data "Ro" and "$R_1$" with the count values and continuously produces a signal while the count value is within an extent corresponding to a distance range between the distance "Ro" and the other distance "$R_1$" and supplies a rectangular signal to one input terminal of a gate 34.

The bearing comparator 32 is supplied at another input terminal thereof with bearing signals from the transmitting and receiving unit 1. The bearing comparator 32 compares the angle data "$\theta_o$" and "$\theta_1$" with the bearing signals from the unit 1 and continuously produces a signal while the the bearing of the radar antenna is within an azimuthal range between the bearing "$\theta_o$" and the other bearing "$\theta_1$" and supplies a rectangular signal to another input terminal of the gate 34. Radar echoes received by the antenna are supplied to another input terminal of the gate 34 from the transmitting and receiving unit 1. The gate 34 passes the radar echoes to an alarm unit 35 while the output signals both from the distance comparator 31 and the bearing comparator 32 are applied at the input terminals thereof at the same time.

Figure 5A:
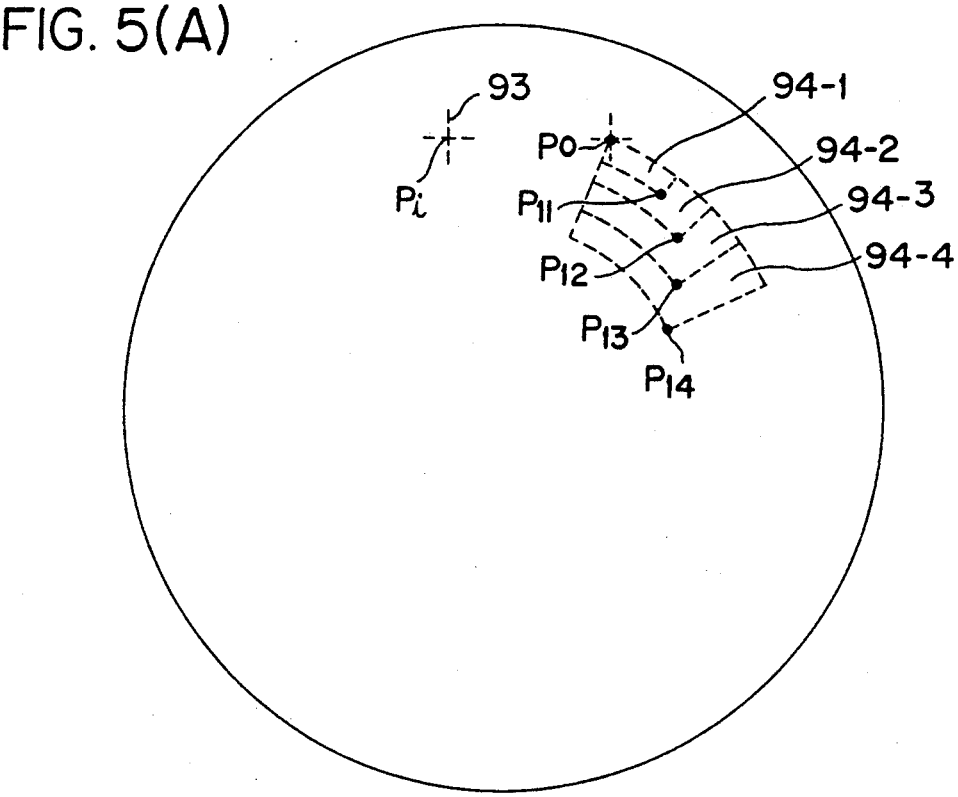
FIG. 5 shows area markers displayed on the screen of an indicator, which are obtained with the embodiment shown in FIG. 4.

Referring to FIG. 5, the operation of the embodiment shown in FIG. 4 according to the present invention will be explained. Referring to FIG. 5(A), it is first assumed that the marker 93 stays at an initial point represented as "Pi" which is determined by the track ball 20. The output signals representative of a position of the marker 93 from the signal generator 21 are supplied to input terminals of the graphic display control unit 28. Signals representative of the marker 93 are produced by the unit 28 and supplied to the marker display memory 11. The signals once stored in the marker display memory 11 are supplied to the indicator 5 through the video amplifier 8 so that the marker 93 is displayed on the screen of the indicator 5. Thus, the marker 93 is indicated at the initial point "Pi". By turning the track ball 20, the marker 93 is moved to a first point "Po" and displayed. The output signals of the signal generator 21 are also supplied to the key switches 24 and 25. The signals representative of the first position of the marker 93 are transmitted to the reference point memory 22 to be stored therein when the key switch 24 is depressed. The output signals of the reference point memory 22 are supplied to the coordinates converter 26 and to the graphic display control unit 28. The depressing action of the key switch 24 associated with the key switch 25 starts to pass the output signals of the signal generator 21 to the present point memory 23. When the marker 93 is moved to a point represented as "P11", signals representative of this point are transmitted to the present memory 23 and stored therein. The output signals of the memory 23 are supplied to the coordinates converter 27 and to the graphic display control unit 28. Signals representative of the first point "PO" (reference point) expressed in polar coordinates (Ro, θo) are supplied to the coordinates converter 29 and to the graphic display control unit 28. Signals representative of the present position "P11" of the marker 93 expressed in polar coordinates ($R_1$, $\theta_1$) are also supplied to the coordinates converter 29 and to the unit 28. Signals representative of a third point "PO'" and a fourth point "P1'" expressed in Cartesian coordinates are produced by the coordinates converter 29 and supplied to the graphic display control unit 28. Signals representative of the two arcs and two straight lines connecting ends of the two arcs to form the area marker 94-1 are produced by the unit 28 and supplied to the marker display memory 11. The signals stored in the memory 11 are read out and supplied to the indicator 5 through the video amplifier 8 so that the area marker 94-1 are displayed on the screen of the indicator 5, for example with two dotted arcs and two dotted straight lines. When the marker 93 is moved to another point represented as "P12", the area marker 94-2 is indicated with the area marker 94-1 erased. When the marker 93 is further moved to another point represented as "P13", the area marker 94-3 is displayed with the area marker 94-2 erased. Signals representative of area markers as 94-1, 94-2, 94-3 . . . stored in the marker display memory 11 are cleared at a time period so that one area marker is displayed at a time. When the marker 93 is moved to the final point represented as "P14", only the area-marker 94-4 is displayed with the area marker 94-3 erased. Then, the key switch 25 is depressed so that the transmission of the output signals of the signal generator 21 is terminated and the signals representative of the final position "P14" of the marker 93 are memorized in the present point memory 23. Thus, the second point "P1" is fixed and the area marker 94-4 is fixedly indicated on the screen. While an alarm is produced by the alarm unit 35 when a target is in the area corresponding to one of the area markers 94-1, 94-2, 94-3 and 94-5, since the output signals of the coordinates converters 26 and 27 are supplied to the distance comparator 31 and the bearing comparator 32.

Figure 5B:
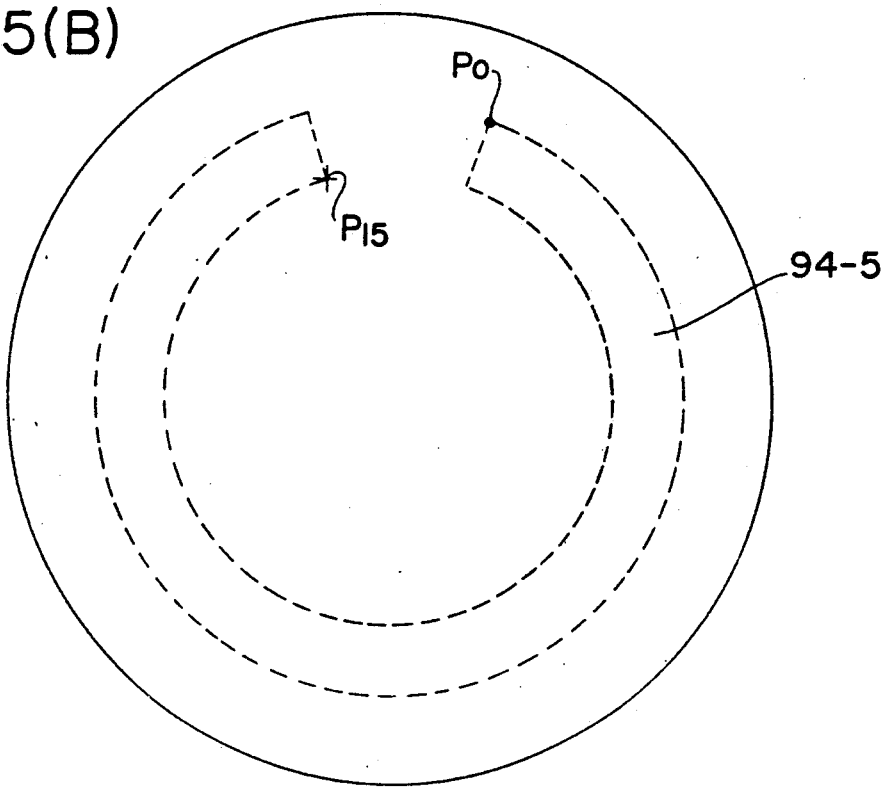

Referring to FIG. 5(B). the marker 93 is moved from a first point represented as "PO" to a second point "P15", thereby displaying an area marker represented as 94-5 on the screen of the indicator 5. An alarm is produced by the alarm unit 35 when a target such as a ship is in the area defined by the area marker 94-5.

It is to be noted that a digital-to-analog converter can also be used in place of the video amplifier 8 in FIGS. 1 and 4.

Figure 6:
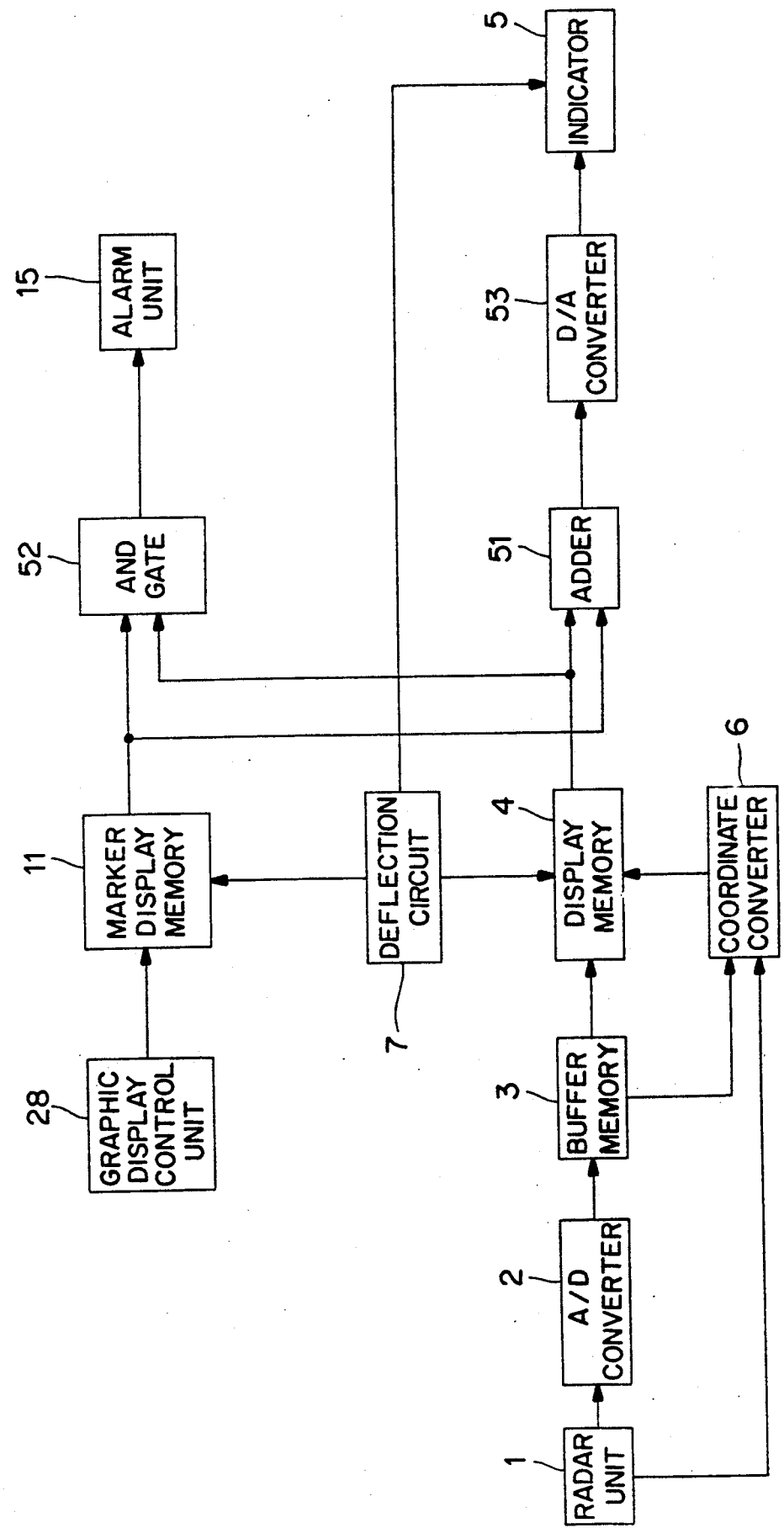
FIG. 6 shows a block diagram of another embodiment according to the present invention.

Referring to FIG. 6, radar echo signals produced by the radar transmitting and receiving unit 1 are converted into digital signals by the A/D converter 2. The resultant digital signals are once stored in the buffer memory 3 and then supplied to the display memory 4 to be written into memory elements identified by the coordinates converter 6. While, signals representative of the whole area defined by an area marker 94 formed by two arcs and two straight lines produced by the graphic display control unit 28 are supplied to and written into the marker display memory 11. The signals stored in the display memory 4 and the marker display memory 11 are read out in response to signals supplied from the deflection circuit 7 in synchronism with the scanning operation of electron beams of the indicator 5. The output signals of the display memory 4 and the marker display memory 11 are supplied to input terminals of an adder 51 and an AND gate 52. The adder 51 adds the output signals of the display memory 4 and the marker display memory 11 to one another and supplies the resultant signals to a digital-to-analog converter (hereinafter referred to as "D/A converter") 53. The D/A converter 53 converts input signals to analog signals which are supplied to the indicator 5. The indicator 5 displays an area bounded with the two arcs and two straight lines and surrounding conditions on the display face thereof. The AND gate 52 produces output signals to the alarm unit 15 when output signals both from the display memory 4 and the marker display memory 11 are simultaneously applied at the respective input terminals thereof so that the alarm unit 15 produces alarms.

It should be noted that although the graphic display control unit 28 produces signals representative of the whole area bounded with two arcs and two straight lines in the embodiment of the present invention shown in FIG. 6, the unit 28 is also capable of producing signals representative of the whole area bounded with a circle. The signals produced are written into the marker display memory 11. The area bounded with a circle is obtained by specifying two points, i.e., the center of the circle and one of the points forming the circumference.

It should be noted that although a track ball is used to specify two points on the display face of the indicator so that signals representative of an area marker are produced in the foregoing embodiments, other means such as a joystick can also be used to move the marker 93. Two points can also be specified or identified by an electronic pencil.

It should be noted that although an alarm is produced when a target is in area defined by the area marker 94 in the foregoing embodiments, radar target echoes can be blinked instead of activating an alarm to inform an operator of situations. This can be achieved by, for example, in the embodiment shown in FIG. 1 incorporating a gate between the display memory 4 and the video amplifier or a digital-to-analog converter which is controlled by the output signals of the intrusion detecting unit 14. It is also possible to blink the area marker 94 when a radar target is in the area defined by an area marker.

While the invention has been described in detail and with reference to specific embodiments thereof, it will be apparent to one skilled in the art that various changes and modifications can be made therein without departing from the spirit and scope of invention.

What is claimed is:

1. A detection system for determining and displaying surrounding conditions of a geographical area and for producing a signal when a target is in a specific geographical area within the geographical area, comprising:

search means for generating search signal;

condition means for receiving reflected search signals and for determining the surrounding conditions from the reflected search signals;

display means, operatively connected to said condition means, for displaying the surrounding conditions determined by said condition means;

marker means for displaying marker on said display means;

positioning means for positioning said marker at a desired point on said display means;

first storing means for storing first position data of a first point established by said positioning means positioning said marker at a desired first point on said display means;

second storing means for storing second position data of a second point established by said positioning means positioning said marker at a desired second point on said display means;

data establishing means, operatively connected to said first and second storing means, for automatically establishing third position data for a third point and fourth position data for a fourth point based on said first and second position data of said first and second points; and area marker generating means, operatively connected to said first and second storing means and said data establishing means, for generating signals representative of an arc connecting said desired first point and said fourth point, another arc connecting said desired second point and said third point, a straight line connecting said desired for point and said third point, and another straight line connecting said desired second point and said fourth point;

said display means displaying two arcs and two straight lines corresponding to said signals generated by said area marker generating means, said two arcs and two straight lines forming an area marker on said display screen, said area marker representing the specific geographical area such that the surrounding conditions of the specific geographical area are displayed in said area marker.

2. The detection system as claimed in claim 1 wherein said search means produces radar signals as said search signals.

3. The detection system as in claim 1 wherein said positioning means comprises a track ball.

4. A detection system for determining and displaying surrounding conditions of a geographical area and for producing a signal when a target is in a specific geographical area within the geographical area, comprising:

search means for generating search signal;

condition means for receiving reflected search signals and for determining the surrounding conditions from the reflected search signals;

display means, operatively connected to said condition means, for displaying the surrounding conditions determined by said condition means;

marker means for displaying a marker on said display means;

positioning means for positioning said marker on said display means;

first storing means for storing first position data of a reference point established by said positioning means positioning said marker at a desired reference point on said display means;

second storing means for storing a plurality of second position data corresponding to a plurality of points successively established by said positioning means positioning said marker at a plurality of successive points on said display means;

boundary establishing means, operatively connected to said first and second storing means, for automatically establishing a third position data for a third point and fourth position data for a fourth point based on said first position data and a last stored second position data;

area marker generating means, operatively connected to said first and second storing means and said boundary establishing means, for generating signals representative of an arc connecting said reference point and said fourth point, another arc connecting a second point represented by said last stored second position data and said third point, a straight line connecting said reference point and said third point, and another straight line connecting said second point and said fourth point; and third storing means, operatively connected to said area marker generating means, for storing said signals generated by said area marker generating means;

said display means displaying signals outputted from said third storing means to display two arcs and two straight lines, said two arcs and two straight lines defining an area marker; said display means increasing or decreasing a display area of said area marker in accordance with said marker being repositioned by said positioning means.

5. The detection system as claimed in claim 4 wherein said positioning means comprises a track ball.

6. A system for displaying an area marker representing a specific geographical area on a display device utilized in an active detection system, comprising:

marker means for displaying a marker on the display device;

positioning means for positioning said marker at a desired point;

position data means for producing first position data corresponding to a first point established by said positioning means positioning said marker at a desired first point on the display device and second position data corresponding to a second point established by said positioning means positioning said marker at a desired second point on the display device; and area marker generating means for controlling the display device to display the area marker which defines the specific geographical area based on said first and the second position data.

7. A detection system for determining and displaying surrounding conditions of a specific geographical area, comprising:

search means for generating search signal;

condition means for receiving reflected search signals and for determining the surrounding conditions from the reflected search signals;

display means, operatively connected to said condition means, for displaying the surrounding conditions determined by said condition means;

marker means for displaying a marker on said display means;

marker means for displaying a marker on said display means;

positioning means for positioning said marker at a desired point on said display means;

position data means for producing first position data corresponding to a first point established by said positioning means positioning said marker at a desired first point on said display means and second position data corresponding to a second point established by said positioning means positioning said marker at a desired second point on said display means; and area marker generating means, operatively connected to said positioned data means, for producing signals representative of an area marker which defines the specific geographical area on said display means based on said first and the second position data;

said display means displaying said area marker according to said signals produced by said area marker generating means.

8. The detection system claimed in claim 7 wherein said search means produces radar signals as said search signals.

9. The detection system as claimed in claim 7 wherein said area marker is formed by two arcs and two straight lines each connecting ends of said two arcs.

10. The detection system as claimed in claim 7 wherein said search means produces sonar signals as said search signals.

11. A system for displaying an area marker representing a specific geographical area on a display device utilized in an active detection system, the system comprising:
   input means for specifying a desired first point and a desired second point on the display device;
   data producing means, operatively connected to said input means, for producing first position data corresponding to said desired first point and second positioning data corresponding to said desired second point;
   signal generating means, operatively connected to said data producing means, for producing signals representing the area marker which defines a specific geographical area, thereby enabling the display device to display the area marker according to said signals produced by said signal generating means when only two points have been specified.

12. A detection system for determining and displaying surrounding conditions of a geographical area, comprising:
   search means for generating search signal;
   condition means for receiving reflected search signals and for determining the surrounding conditions from the reflected search signals;
   display means, operatively connected to said condition means, for displaying the surrounding conditions determined by said condition means;
   marker means for specifying a desired first point and a desired second point on said display means;
   data producing means, operatively connected to said marker means, for producing first position data corresponding to said desired first point and second position data corresponding to said desired second point; and
   signal generating means, operatively connected to said data producing means, for producing signals representing an area marker, said area marker defining a specific geographical area within the geographical area;
   said display means displaying said area marker according to said signals produced by said signal generating means when only two points have been specified.

13. A detection system for determining and displaying surrounding conditions of a geographical area and for producing a signal when a target is in a specific geographical area within the geographical area, comprising:
   search means for generating search signal;
   condition means for receiving reflected search signals and for determining the surrounding conditions from the reflected search signals;
   display means, operatively connected to said condition means, for displaying the surrounding conditions determined by said condition means;
   marker means for specifying a desired first point and a desired second point on said display means;
   data producing means, operatively connected to said marker means, for producing first position data corresponding to said desired first point and second positioning data corresponding to said desired second point; and
   signal generating means, operatively connected to said data producing means, for producing signals representing an area marker, said area marker defining the specific geographical area within the geographical area;
   said display means displaying said area marker according to said signals produced by said signal generating means when only two points have been specified.

14. A detection system for determining and displaying surrounding conditions of a geographical area and for producing a warning signal when a target is in a specific geographical area within the geographical area, comprising:
   search means for generating search signal;
   condition means for receiving reflected search signals and for determining the surrounding conditions from the reflected search signals;
   display means, operatively connected to said condition means, for displaying the surrounding conditions determined by said condition means;
   marker means for specifying a desired first point and a desired second point on said display means;
   data producing means, operatively connected to said marker means, for producing first position data corresponding to said desired first point and second position data corresponding to said desired second point;
   area signal producing means, operatively connected to said data producing means, for producing signals representative of an area defined by said first and second positioned data; and
   warning means, operatively connected to said area signal producing means and said condition means, for producing the warning signal when output signals from said are signal producing means and said condition means are simultaneously applied at input terminals thereof.

15. The detection system as claimed in claim 14 wherein said area is a circle.

16. The system as claimed in claim 6 further comprising storing means for temporarily storing signals produced by said area marker generating means which represent the displayed area marker.

17. The detection system as claimed in claim 12 further comprising storing means for temporarily storing said signals produced by said signal generating means.

* * * * *